US012515598B2

(12) United States Patent
Kuribayashi et al.

(10) Patent No.: US 12,515,598 B2
(45) Date of Patent: Jan. 6, 2026

(54) ELECTRONIC CONTROL UNIT, ELECTRONIC CONTROL SYSTEM, LOG PROCESSING METHOD, AND NON-TRANSITORY COMPUTER-READABLE STORAGE MEDIUM STORING LOG PROCESSING PROGRAM

(71) Applicants: DENSO CORPORATION, Kariya (JP); TOYOTA JIDOSHA KABUSHIKI KAISHA, Toyota (JP)

(72) Inventors: Haruka Kuribayashi, Kariya (JP); Naoya Fukuchi, Kariya (JP); Tokuya Inagaki, Kariya (JP); Ryosuke Murakami, Kariya (JP); Shogo Watanabe, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 18/527,467

(22) Filed: Dec. 4, 2023

(65) Prior Publication Data

US 2024/0208441 A1 Jun. 27, 2024

(30) Foreign Application Priority Data

Dec. 27, 2022 (JP) .................................. 2022-210371

(51) Int. Cl.
*B60R 16/02* (2006.01)
*B60R 16/023* (2006.01)
*G07C 5/08* (2006.01)

(52) U.S. Cl.
CPC .......... *B60R 16/0232* (2013.01); *G07C 5/085* (2013.01)

(58) Field of Classification Search
None
See application file for complete search history.

(56) References Cited

U.S. PATENT DOCUMENTS

| 10,320,826 | B2* | 6/2019 | Kishikawa | ........ H04L 12/40032 |
| 12,106,610 | B2* | 10/2024 | Hirano | ................. G07C 5/0808 |
| 2014/0058583 | A1* | 2/2014 | Kesavan | ................ B62D 41/00 |
| | | | | 701/1 |
| 2022/0001835 | A1* | 1/2022 | Kim | ....................... B60R 25/00 |
| 2022/0017041 | A1 | 1/2022 | Imoto et al. | |
| 2023/0156027 | A1 | 5/2023 | Sugashima et al. | |

FOREIGN PATENT DOCUMENTS

| JP | 20131141 A | 1/2013 |
| JP | 2022-017873 A | 1/2022 |
| JP | 2022-017889 A | 1/2022 |

* cited by examiner

*Primary Examiner* — Abdhesh K Jha
(74) *Attorney, Agent, or Firm* — Harness, Dickey & Pierce, P.L.C.

(57) ABSTRACT

By an electronic control system, a log processing method, or a non-transitory computer-readable storage medium storing a log processing program, an electronic control unit is caused to: detect an abnormality in the electronic control unit when a power source state is an ignition-on state and an ignition-off state; acquire power source information of a vehicle; generate a security event log; store the security event log; and transmit the security event log.

18 Claims, 14 Drawing Sheets

FIG. 5A

| HEADER |
|---|
| ECU ID |
| SENSOR ID |
| EVENT ID <br> ID : 1 |
| COUNTER |
| TIME STAMP |
| CONTEXT DATA |

POWER SOURCE STATE
IG ON

| HEADER |
|---|
| ECU ID |
| SENSOR ID |
| EVENT ID <br> ID : 2 |
| COUNTER |
| TIME STAMP |
| CONTEXT DATA |

POWER SOURCE STATE
IG OFF

FIG. 5B

| HEADER |
|---|
| ECU ID |
| SENSOR ID |
| EVENT ID |
| COUNTER |
| TIME STAMP |
| CONTEXT DATA <br> IG ON |

POWER SOURCE STATE
IG ON

| HEADER |
|---|
| ECU ID |
| SENSOR ID |
| EVENT ID |
| COUNTER |
| TIME STAMP |
| CONTEXT DATA <br> IG OFF |

POWER SOURCE STATE
IG OFF

ELECTRONIC CONTROL UNIT, ELECTRONIC CONTROL SYSTEM, LOG PROCESSING METHOD, AND NON-TRANSITORY COMPUTER-READABLE STORAGE MEDIUM STORING LOG PROCESSING PROGRAM

CROSS REFERENCE TO RELATED APPLICATION

The present application claims the benefit of priority from Japanese Patent Application No. 2022-210371 filed on Dec. 27, 2022. The entire disclosure of the above application is incorporated herein by reference.

TECHNICAL FIELD

The present disclosure mainly relates to an electronic control unit, an electronic control system, a log processing method, and a non-transitory computer-readable storage medium storing a log processing program for processing a security event log that is output when a security event occurs in an electronic control system installed in a mobile object such as an automobile.

BACKGROUND

In recent years, technologies for driving support and autonomous driving control, including V2X such as vehicle-to-vehicle communication and roadside-to-vehicle communication, have been attracting attention. Along with this, vehicles have come to be equipped with a communication function, and vehicles are becoming more connected. As a result, a probability that a vehicle may receive a cyberattack such as unauthorized access from the outside or the like increases. Therefore, it may be necessary to analyze cyberattacks on vehicles and to take countermeasures against the cyberattacks.

There are various technologies for detecting abnormalities occurring in vehicles and analyzing the cyberattacks based on the detected abnormalities. In a comparative example, it is described that an attack path analysis unit of a center device analyzes the received abnormality log to estimate the attack path of the attack on a vehicle. The abnormality log is generated by a security sensor of each ECU of an electronic control system to be sent to the center device.

SUMMARY

By an electronic control system, a log processing method, or a non-transitory computer-readable storage medium storing a log processing program, an electronic control unit is caused to: detect an abnormality in the electronic control unit when a power source state is an ignition-on state and an ignition-off state; acquire power source information of a vehicle; generate a security event log; store the security event log; and transmit the security event log.

BRIEF DESCRIPTION OF DRAWINGS

FIG. 5A is an explanatory diagram illustrating an example of the security event log output from a log generation unit.

FIG. 5B is an explanatory diagram illustrating an example of the security event log output from a log generation unit.

DETAILED DESCRIPTION

Figure 1:
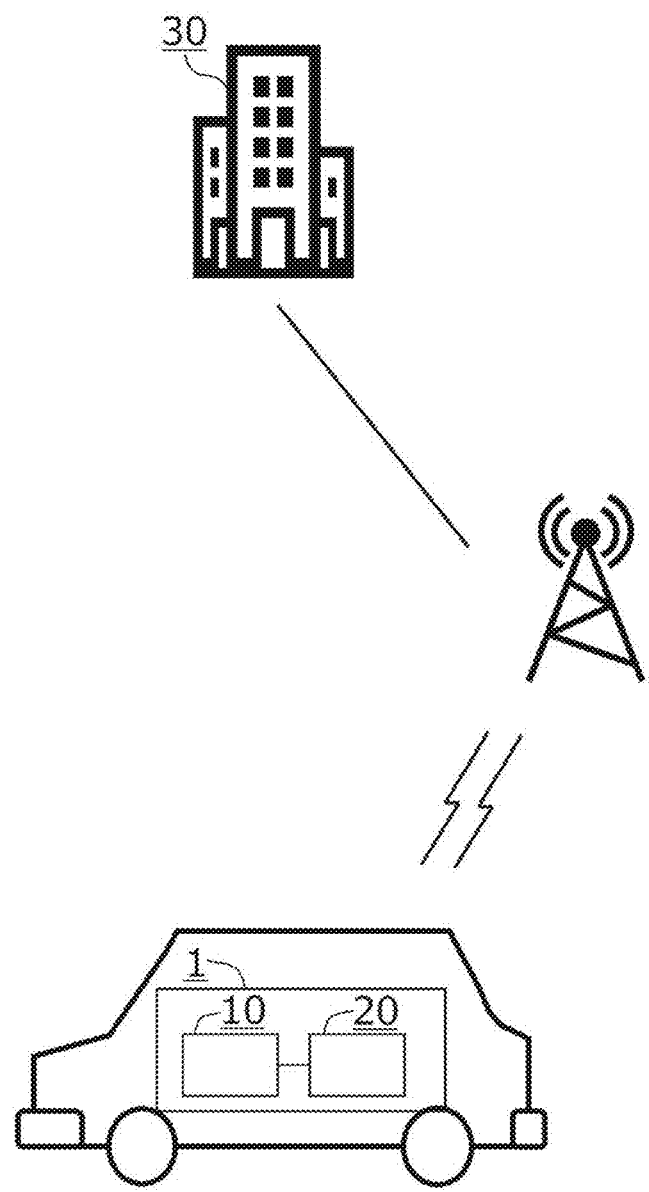
FIG. 1 is a diagram for illustrating an arrangement of an electronic control unit, an electronic control system, and an external device.

Here, the inventors of the present disclosure have found the following difficulties. When an ignition power source of a vehicle is in an off-state (IG OFF), such as when the vehicle is parked, the power supply to the ECU is cut off or a process is stopped, and log management application software (hereinafter referred to as a log management app as appropriate) may not be activated. Therefore, security event logs generated by other ECUs in the IG OFF state cannot be used to analyze the abnormality.

Therefore, one example of the present disclosure provides a technology that appropriately processes a security event log according to a power source state of a vehicle when the security event log is generated and utilizes a security event log for abnormality analysis.

According to one example embodiment of the present disclosure, an electronic control system includes; at least one electronic control unit mounted on a vehicle; and a log management device. The electronic control unit includes: a security sensor configured to detect an abnormality in the electronic control unit when the power source state is an ignition-on state and an ignition-off state; a power source information acquisition unit configured to acquire power source information indicating the power source state of the vehicle when the abnormality is detected; a log generation unit configured to generate a security event log including the power source information based on an output of the security sensor; a storage configured to store the security event log; and a communication unit configured to transmit the security event log. The log management device includes: a log aggregation unit configured to evaluate and/or select the security event log received from the electronic control unit when the power source state is the ignition-on state; and a transfer unit configured to transfer the security event log evaluated and/or selected by the log aggregation unit to an external device.

According to another example embodiment, a log processing method is executed by an electronic control system comprising: at least one electronic control unit mounted on a vehicle; and a log management device. The method includes: causing the electronic control unit to: detect an abnormality in the electronic control unit when the power source state is an ignition-on state and an ignition-off state; acquire power source information indicating the power source state of the vehicle when the abnormality is detected; generate a security event log including the power source information based on an output of the security sensor; store the security event log; and transmit the security event log; and causing the log management device to: evaluate and/or select the security event log received from the electronic control unit when the power source state is the ignition-on state; and transfer the security event log that is evaluated and/or selected to an external device.

Further, according to another example embodiment, a non-transitory computer readable storage medium stores a log processing program executable by an electronic control unit mounted on a vehicle. The program is configured to cause a processor to: detect an abnormality of the electronic control unit; acquire power source information indicating a power source state of the vehicle when detecting the abnormality; generate a security event log including the power source information based on a detection result of the abnormality; store the security event log; and transmit the security event log.

According to the above-described configuration, the security event log includes power information, so it is possible to analyze the security event log according to the power source state of the vehicle.

Hereinafter, embodiments of the present disclosure will be described with reference to the drawings.

1. Configuration Based on Embodiments

(1) Arrangement of Each Device

First, an arrangement of an electronic control unit 10, a log management device 20, and an external device 30 of the present embodiment will be described with respect to FIG. 1. An electronic control system 1 includes one or more "electronic control units" (hereinafter referred to as ECUs) 10 and the log management device 20, and is "installed" in a "vehicle". Here, the "vehicle" refers to a movable object, and the movement speed is arbitrary. It also includes the case where the vehicle is stopped. For example, the "vehicle" may include automobiles, motorcycles, bicycles, and objects mounted thereon. But it is not limited to these examples. The "installed" state includes not only cases where the device is directly fixed to the vehicle, but also cases where the device is not fixed to the vehicle but moves with the vehicle. For example, the state may include a case in which a person on board the vehicle carries the device, or a case in which the device is mounted on a load placed on the vehicle. The "electronic control unit" may be not only a physically independent electronic control unit but also a virtual electronic control unit implemented by using a virtualization technology.

The ECU 10, the log management device 20, and the ECUs 10 are connected to each other via an in-vehicle communication network such as, for example, a CAN (Controller Area Network) or a LIN (Local Interconnect Network). Alternatively, the connection may be made using any communication method, whether wired or wireless, such as Ethernet (registered trademark), Wi-Fi (registered trademark), or Bluetooth (registered trademark). Note that although the log management device 20 is provided inside the electronic control system 1 in FIG. 1, the log management device 20 may be provided outside the electronic control system 1. In addition, the connection refers to a state in which data can be exchanged, and includes virtual connections between virtual machines implemented on the same hardware as well as a case in which different hardware are connected via wired or wireless communication network.

The external device 30 is provided outside the vehicle, and is implemented by, for example, a server device. For example, the external device 30 mainly provides various information to the electronic control system 1 and the log management device 20, acquires security event logs from the log management device 20, and analyzes the type of cyberattack and the attack route of the cyberattack. The external device 30 is also called a center device or attack analysis device.

The external device 30 and the electronic control system 1 or the log management device 20 are connected via a communication network such as a wireless communication system such as, for example, IEEE 802.11 (Wi-Fi (registered trademark)), IEEE 802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, or 5G. Alternatively, dedicated short range communication (DSRC) may be used. When the vehicle is parked in a parking lot or housed in a repair shop, a wired communication system may be used instead of a wireless communication system. For example, a LAN (Local Area Network) such as Ethernet (registered trademark), the Internet, an optical line, or a fixed telephone line may be used. In addition, a line that combines a wireless communication system and a wired communication system may be used. For example, the electronic control system 1 and a base station device in a cellular system may be connected by a wireless communication system such as 4G. The base station device and the external device 30 may be connected by a wired communication system such as a backbone line of a telecommunications carrier or the Internet. A gateway device may be provided at a connection point between the backbone line and the Internet.

(2) Configuration of Electronic Control System 1

Figure 2:
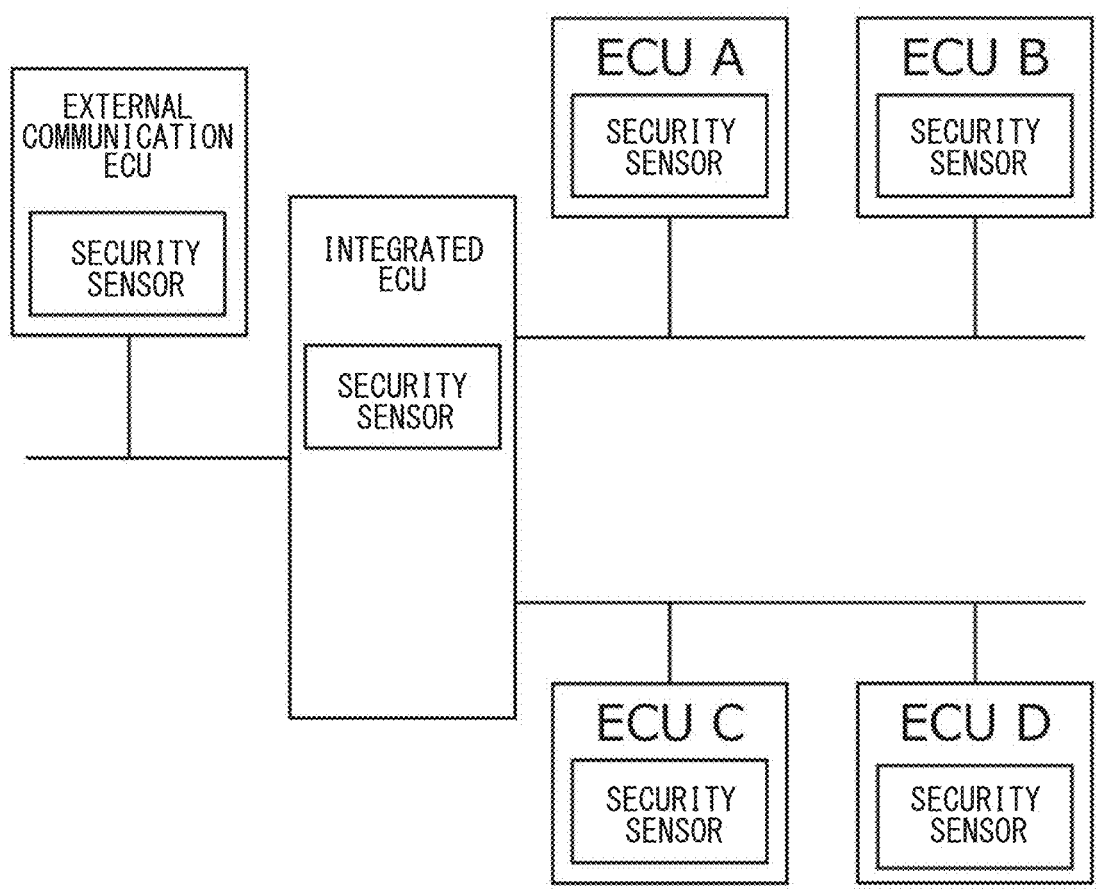
FIG. 2 is a block diagram illustrating a configuration example of an electronic control system.

FIG. 2 is a diagram showing a configuration example of the electronic control system 1. The electronic control system 1 includes multiple ECUs, including an external communication ECU and an integrated ECU, which are connected via the in-vehicle communication network. FIG. 2 illustrates one external communication ECU, one integrated ECU, and four individual ECUs (ECUs A, B, C, and D). The electronic control system 1 may include any number of ECUs. The term of ECUs or each ECU is used as a generic term for the external communication ECU, the integrated ECU, and the individual ECUs.

The external communication ECU is an ECU that communicates with the outside. The communication method used by the external communication ECU is as described in the above-mentioned wireless communication method and wired communication method. In order to implement multiple communication systems, multiple external communication ECUs may be provided.

The integrated ECU is an ECU having a gateway function that mediates between individual ECUs and the external communication ECU. Further, the integrated ECU may be provided with a function to control the entire electronic control system 1, for example, a security function and a function to manage security event logs of a log management app or the like. The integrated ECU may be referred to as a gateway ECU (G-ECU) or a mobility computer (MC). Further, the integrated ECU may be a relay device or a gateway device. In an embodiment described later, the log management device 20 is implemented by the integrated ECU.

The individual ECUs of the electronic control system 1 may be ECUs having arbitrary functions. The electronic control unit (ECU) may be, for example, a drive system electronic control device that controls an engine, a steering wheel, a brake, etc. The ECU may be, for example, a vehicle body electronic control device that controls a meter, and a power window, etc. The ECU may be, for example, an information system electronic control device such as a navigation device. The ECU may be, for example, a safety control electronic control device that controls to prevent a collision with an obstacle or a pedestrian, or a power source system electronic control unit that controls a power of a battery or the like. Further, the ECUs may be classified into masters and slaves instead of being parallel to each other. Note that the log management device 20 may be implemented by an individual ECU.

The ECU may be a physically independent ECU, or may be a virtual ECU (or may be called a virtual machine), which is virtually implemented.

In the electronic control system 1 shown in FIG. 2, each ECU is equipped with a security sensor. Not all ECUs need to be equipped with security sensors. In the embodiments described later, an ECU equipped with a security sensor corresponds to an ECU 10. That is, the ECU 10 is not limited to an individual ECU, but may be an external communication ECU or an integrated ECU.

(3) Security Event Log Format

Figure 3:
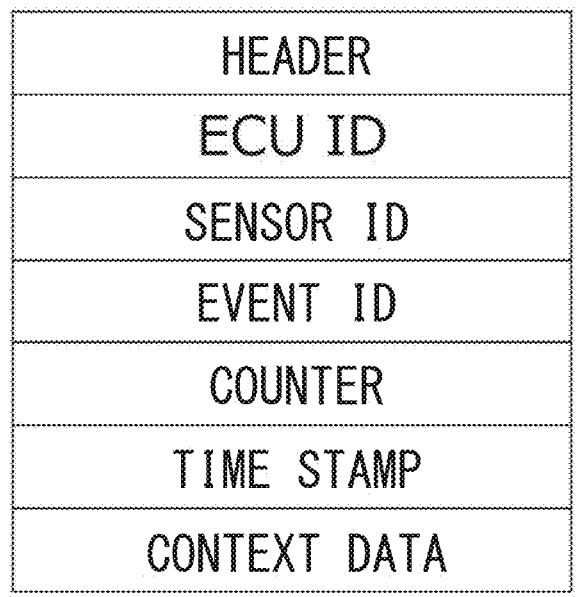
FIG. 3 is an explanatory diagram illustrating a security event log output from a security sensor of the electronic control unit.

FIG. 3 is a diagram showing the contents of a security event log generated based on the output of the security sensor of each ECUs constituting the electronic control system 1.

The security event log includes fields (areas) of: an ECU ID indicating the identification information of the ECU in which the security sensor is mounted; a sensor ID indicating the identification information of the security sensor; an event ID indicating the identification information of the security event; a counter indicating the number of occurrences of the event; a timestamp indicating the time of occurrence of the event; and context data indicating a detail of the output of the security sensor. The security event log may also have a header containing information indicating a protocol version and a state of each area.

According to the specifications defined by AUTOSAR (AUTomotive Open System ARchitecture), IdsM Instance ID corresponds to ECUID, Sensor Instance ID corresponds to the sensor ID, Event Definition ID corresponds to the event ID, Count corresponds to the counter, Timestamp corresponds to the timestamp, Context Data corresponds to the context data, Protocol Version and Protocol Header correspond to the header, respectively. According to the AUTOSAR specifications, IdsM Instance ID (ECUID), Sensor Instance ID (sensor ID), Event Definition ID (event ID), Count (counter) are required areas, Timestamp (time stamp), Context Data (context data) data) is an optional area.

Although FIG. 3 is an example of an abnormality log indicating an abnormality, normal logs such as security heartbeats may also have the same specifications as FIG. 3. In that case, the context data of the normal log may be omitted. In addition, by setting a flag indicating the presence or absence of the context data in the header, it may be possible to distinguish between the abnormality log and a normal log by checking the flag.

Further, FIG. 3 shows a security event log generated by the ECU that is physically independent. The security event log may be generated by a virtual ECU.

The security event log generated by the security sensor is called SEv. A narrowed down and accurate security event log is called QSEv. For example, the security sensor of the individual ECU in FIG. 2 generates SEv and reports it to an intrusion detection system manager (IdsM). If the SEv passes a certification filter and meets specified criteria at IdsM, it is transmitted as QSEv from an intrusion detection reporter. In this embodiment, the output (SEv) of the security sensor will be described as a security event, and the output (QSEv) of a log generation unit including IdsM and the like will be described as the security event log.

2. First Embodiment

When the ignition power source of the vehicle is in an on-state (IG ON), the ignition power is supplied to the ECU 10 and the log management device 20. However, when the vehicle power source state is the IG OFF, the ignition power source cannot be used and only the battery power source can be used. In this case, in order to reduce power consumption, the operation of the log management app of the log management device 20 may be stopped. On the other hand, the ECU connected to the log management device 20 may be one that continues to operate even in the case of the IGOFF, such as, for example, an ECU that controls doors or lights, or one that continues to operate for a certain time after the IG OFF. Furthermore, the ECU may be one that continues only some function operations. In the case of such an ECU, since battery power source is supplied to the ECU, there is a possibility that it becomes a target of a cyberattack. When the cyberattack occurs, the security event log is generated. The ECU 10 of this embodiment is assumed to be an ECU that operates on the battery power source even when the IG is OFF. In this way, in the case where the ECU 10 operates and the log management device 20 does not operate during the IG OFF, even when the security event log generated by the ECU 10 is output to the log management device 20, the log management device 20 cannot receive it. Therefore, the security event is lost. In the following embodiments, the configuration and operation of the ECU 10 and the log management device 20 in such a power source state will be described. However, the configuration and operation of this embodiment can also be applied to the ECU 10 and the log management device 20 in those other than such operating states.

(1) Configuration of ECU 10

Figure 4:
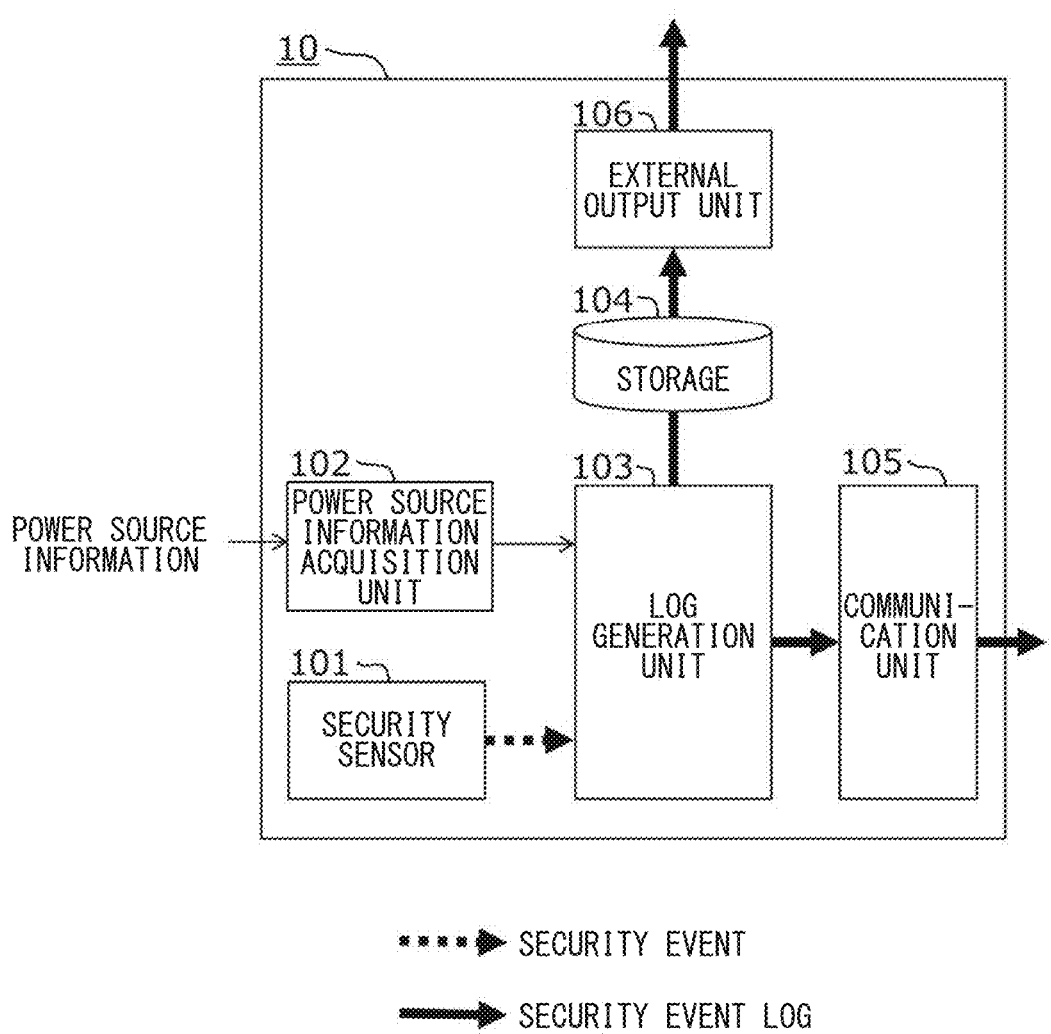
FIG. 4 is a block diagram illustrating a configuration example of the electronic control unit according to a first embodiment.

FIG. 4 is a block diagram showing the configuration of the ECU 10 in this embodiment. The ECU 10 includes a security sensor 101, a power source information acquisition unit 102, a log generation unit 103, a storage 104, a communication unit 105, and an external output unit 106. The ECU 10 is implemented, for example, by hardware devices and software that constitute each ECU.

The security sensor 101 detects "an abnormality in the electronic control unit", that is, an abnormality in the ECU 10. The detection result is output as a security event (SEv), for example. In this embodiment, the security sensor 101 operates regardless of whether the power source state is in the IG ON or IG OFF. Here, the "abnormality in the electronic control unit" may refer to any abnormality detected in the electronic control unit, and in addition to abnormalities occurring in the electronic control unit itself, may include an abnormality in the network to which the electronic control unit is connected, the abnormality being detected by the electronic control unit.

The power source information acquisition unit 102 acquires power source information indicating the "power source state" of the vehicle when the security sensor 101 detects the abnormality. In this embodiment, the power source state is information regarding whether the ignition (IG) power of the vehicle is turned on or off. In addition to this example, the power source state may be information regarding the type of battery used when the IG is turned on or when the IG is turned off. Here, the "power source state" may be information that specifies the supply source of the power source, in addition to information regarding ON or OFF of the ignition power source of the vehicle.

The power source state when the security sensor 101 detects an abnormality can be obtained by, for example, inquiring a power management block (not shown) about the power source state when there is an output from the security sensor 101. Alternatively, data transmitted when the IG is turned on or when the IG is turned off, such as, for example, CAN data, may be recorded, and the data may be obtained by referring to the latest CAN data.

The log generation unit 103 generates a security event log based on the output of the security sensor 101. For example, a security event log (QSEv) is generated based on a security event (SEv) output by the security sensor 101. The log generation unit 103 is configured by, for example, an IdsM (Intrusion detection system Manager) module.

In this embodiment, the log generation unit 103 generates a security event log "including power source information" acquired by the power source information acquisition unit 102. For example, the IG ON state is stored as 0x00, and the IG OFF state is stored as 0x01 in a predetermined area of the security event log. Here, the security event log "including power information" may include not only the power source information itself but also information obtained by converting the power source information so that the power source information can be restored.

FIG. 5A shows an example of a security event log generated by the log generation unit 103. In the example shown in the figure, the log generation unit 103 generates a security event log having a different event ID depending on the power source state in order to distinguish, using the event ID, the power source state of the vehicle when the abnormality is detected. In the example of FIG. 5A, in the case of the IG ON state, ID:1 is assigned as the event ID, and in the case of the IG OFF state, ID:2 is assigned as the event ID. Thereby, it is possible to manage the event IDs of the security event log separately according to the power source state of the vehicle. Further, by using the essential ID area in the security event log, it is possible to generate the security event log including power source information without increasing the size of the security event log.

In FIG. 5A, the power source information is included in the event ID area of the ID area, but it may be included in other ID areas, such as the ECU ID area or the sensor ID area.

FIG. 5B shows a different example of a security event log generated by the log generation unit 103. As shown in the figure, the log generation unit 103 uses a context data area as the area that includes the power source state of the vehicle. In the example of FIG. 5B, when the IG ON state is present, the IG ON is written in the context data area, and when the IG OFF state is present, the IG OFF is written. Alternatively, the IG ON state may be defined as 0x00 and the IG OFF state may be defined as 0x01, and these may be written in the context data area. Thereby, by using the context data area, which is an optional area, instead of the essential ID area in security event log, the number of IDs to be managed is reduced, it is possible to reduce the program size of the detection ECU and log management app. Further, since the ID area has a fixed length of 6 to 16 bits, it is useful when writing information larger than this.

Note that the security event log generated by the log generation unit 103 to distinguish the power source state of the vehicle is not limited to the format shown in FIGS. 5A and 5B. For example, the ID area may be used to distinguish between the IG ON state and the IG OFF state, and the context data area may be used to specifically specify the power source state of the vehicle, so that the power source state may be distinguished in more detail. For example, the remaining battery level and the type of connected battery may be written.

The security event log generated by the log generation unit 103 includes vehicle power source information when the security sensor 101 detects an abnormality. Therefore, information regarding the power source state of the vehicle can be utilized in analyzing the security event log. For example, it is possible to improve the efficiency and accuracy of security event log analysis by excluding, from the analysis target, attacks that cannot occur under the power source supply situations when the abnormality is detected. Further, by including the power source information as part of the security event log, it is possible to use the vehicle power source information simply by referring to the contents of the security event, without referring to information other than the security event log.

In this embodiment, although the log generation unit 103 includes the power source information in the security event log, the security event (SEv) output from the security sensor 101 may include the power source information. Even in this case, since the security event log that is the output of the log generation unit 103 includes power source information, it can be assumed that the log generation unit 103 generates the security event log that includes the power information based on the output of the security sensor 101.

The storage 104 stores the security event log generated by the log generation unit 103. The ECU 10 uses ignition power at the time of the IG ON, and uses the battery power source at the time of the IG OFF, and the power is supplied regardless of whether the IG ON or IG OFF. Therefore, the storage 104 may be either non-volatile memory or volatile memory.

Although the storage 104 may store all the security event logs generated by the log generation unit 103 regardless of the power source state, in this embodiment, the storage 104 does not store the security event logs in the IG ON state and stores these in the IG OFF state.

The communication unit 105 transmits the security event log generated by the log generation unit 103 to the log management device 20. In this embodiment, in the case of the IG ON state, the communication unit 105 transmits the security event log, but in the case of the IG OFF state, the log management app of the log management device 20 is not operating. Therefore, the communication unit 105 does not transmit the security event log, and the storage 104 stores the security event log. Thereby, it is possible to prevent the security event log generated during the IG OFF from disappearing and can use it for the abnormality analysis.

Thereafter, when the power source state changes from the IG OFF to the IG ON, the log management app of the log management device 20 starts operating, so the communication unit 105 may transmit the security event log stored in the storage 104.

However, even when the power source state changes from the IG OFF to the IG ON, the communication unit 105 may not transmit the security event log stored in the storage 104. In this case, the ECU 10 retains the security event log in the storage 104 as is. Then, when a read request is made from an external device, the ECU 10 outputs the security event log stored in the storage 104 from the external output unit 106 and passes it to the external device. Examples of the external device include diagnostic devices used for diagnosis during vehicle maintenance.

(2) Configuration of Log Management Device 20

Figure 6:
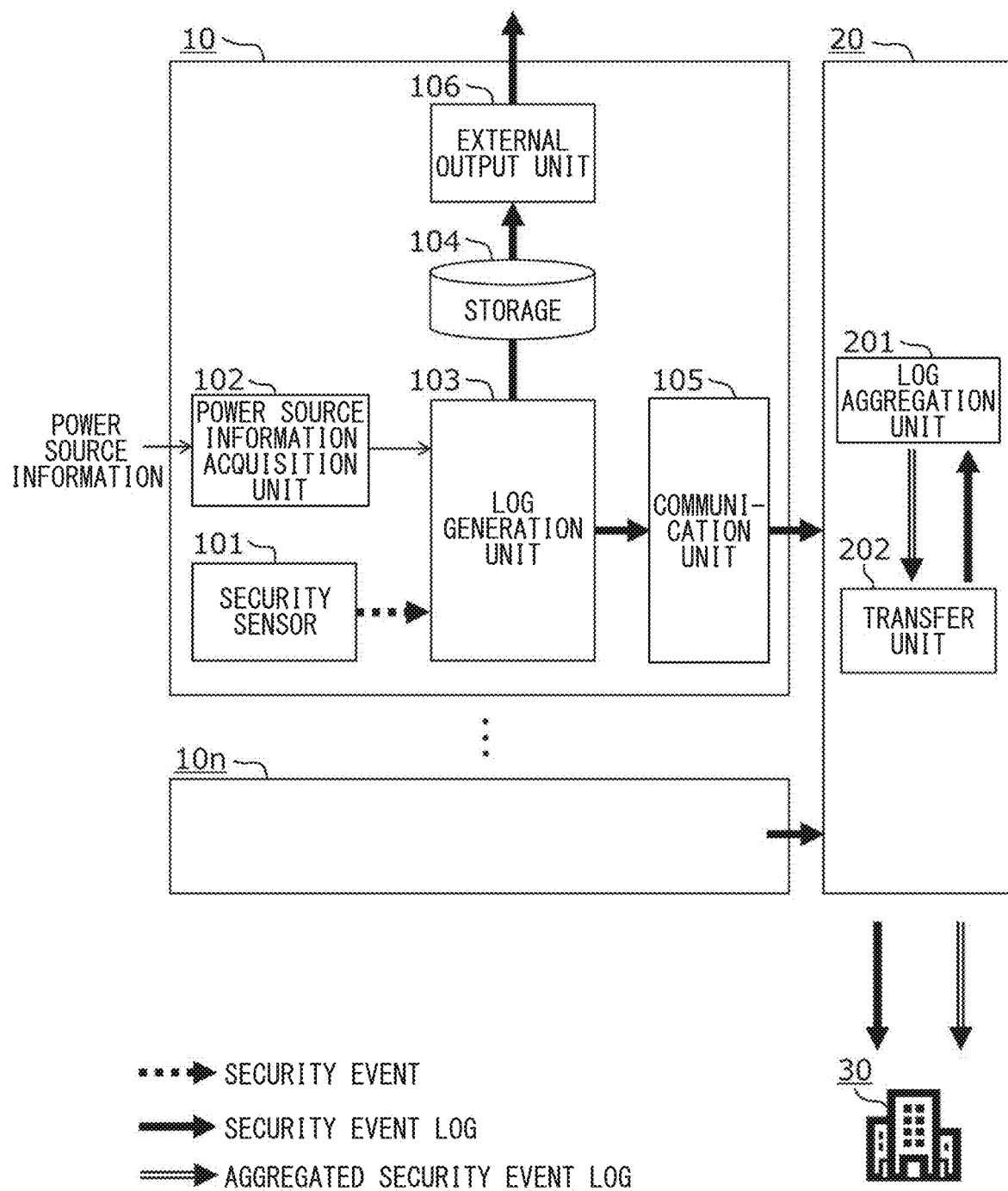
FIG. 6 is a block diagram illustrating a configuration example of the electronic control system according to the first embodiment.

FIG. 6 is a block diagram showing the configuration of the electronic control system 1 in this embodiment. The electronic control system 1 includes one or more ECUs 10 and the log management device 20. FIG. 6 shows an example in which n ECUs 10 are connected.

In FIG. 6, the log management device 20 includes a log aggregation unit 201 and a transfer unit 202. In this embodiment, the log management device 20 is implemented by executing the log management app on the integrated ECU.

As described with the communication unit 105 of the above ECU 10, the log management device 20 operates in the IG ON state, so it receives from the ECU 10 the security event log indicating the abnormality detected at the time of the IG ON. In addition, when the IG OFF state changes to the IG ON state, the log management device 20 may receive a security event log indicating an abnormality detected during the IG OFF time from the ECU 10.

The log aggregation unit 201 evaluates and/or selects security event logs received from the ECU 10. Specifically, the received security event log is evaluated and selected using predetermined criteria. For example, the security event logs are ranked by importance, and security event logs exceeding a predetermined importance are selected. Alternatively, when a certain number of security event logs are received, unnecessary security event logs that are not sent to the external device 30 may be excluded from the transmission targets. When receiving a security event log with a flag indicating that it is important, the transfer unit 202 may be instructed to transmit the security event logs received before and after the important security event log to the external device 30. Note that the log aggregation unit 201 may perform only evaluation. Further, the log aggregation unit 201 may perform only selection without evaluation. Hereinafter, evaluation and/or selection will be abbreviated as aggregation.

The transfer unit 202 transfers the security event logs aggregated by the log aggregation unit 201 to the external device 30. The transfer unit 202 includes, for example, an IdsR (Intrusion detection system Reporter) module or the like.

3. Specific Operation Example in First Embodiment (1) First Example

Figure 7:
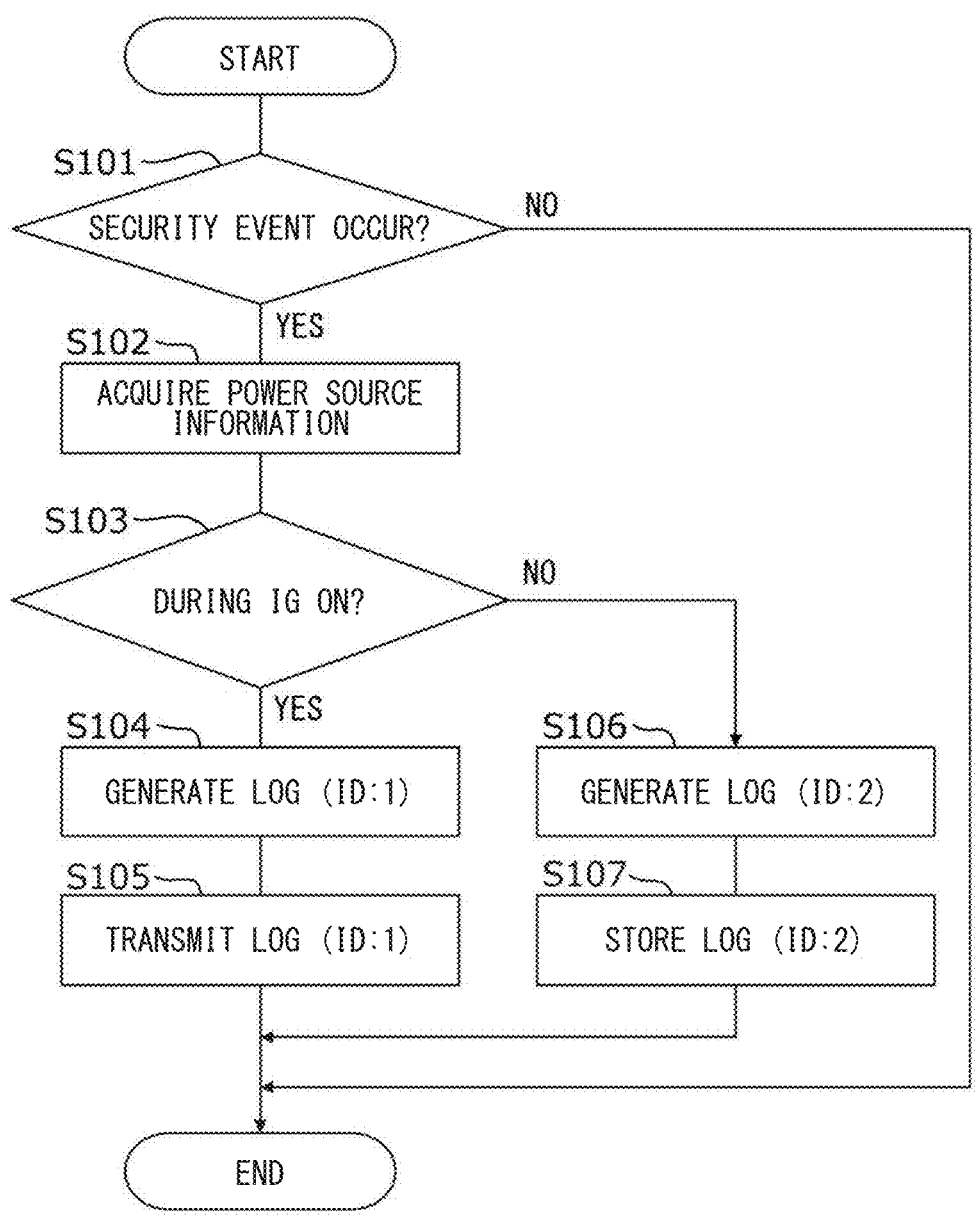
FIG. 7 is a flowchart illustrating operations of the electronic control unit according to the first embodiment.

Next, with reference to FIG. 7, the operation of the ECU 10 of this embodiment will be described. FIG. 7 not only shows a log processing method executed by the ECU 10, but also shows a processing procedure of a log processing program that can be executed by the ECU 10. These processes are not limited to the order illustrated in FIG. 7. That is, the order may be properly changed as long as there is no restriction such as a relationship in which a result of a previous process is used in a subsequent process. The same applies to the flowcharts of other embodiments.

When a security event indicating an abnormality detected by the security sensor 101 of the ECU 10 mounted on the vehicle occurs (S101: Yes), the power source information acquisition unit 102 acquires power source information indicating the power source state of the vehicle (S102). Specifically, the power source information acquisition unit 102 acquires power source information regarding whether the power source state of the vehicle is IG ON or IG OFF. The power source information acquisition unit 102 acquires power source information from a power source management ECU included in the vehicle or information acquired through communication.

When the power source state of the vehicle is IG ON at the time of the security event occurrence (S103: Yes), the log generation unit 103 generates a security event log with the event ID as ID:1 (S104), and transmits the generated security event log to the log management device 20 (S105). In this case, after transmitting the security event log, the ECU 10 may discard the transmitted security event log since it is not necessary to retain the transmitted security event log.

When the power source state of the vehicle is not IG ON at the time of the security event occurrence (S103: No), the log generation unit 103 generates a security event log with the event ID as ID:2 (S106), and saves the generated security event log in the storage 104 (S107).

Note that the ECU 10 that stores the security event log in the storage 104 is activated even when the power source state of the vehicle is not in the IG ON state. Therefore, the storage 104 may be a volatile memory such as a RAM (Random Access Memory). However, even when the power source is turned off, the security event log saved in S107 can be retained, so the nonvolatile memory is preferable as the storage 104.

The security event log stored in the storage 104 is output to the log management device 20 when the power source state of the vehicle is set to the IG ON, as described in the second embodiment below. However, when, in the system configuration, there is a restriction that prevents the security event log stored in the storage 104 from being transmitted, the security event log stored in the storage 104 is read out in response to an external request.

According to the ECU 10 of this embodiment, by storing the security event log generated when the vehicle power source state is not in the IG ON, it is possible to prevent the generated security event log from disappearing and use it for the abnormality analysis.

(2) Second Example

Figure 8:
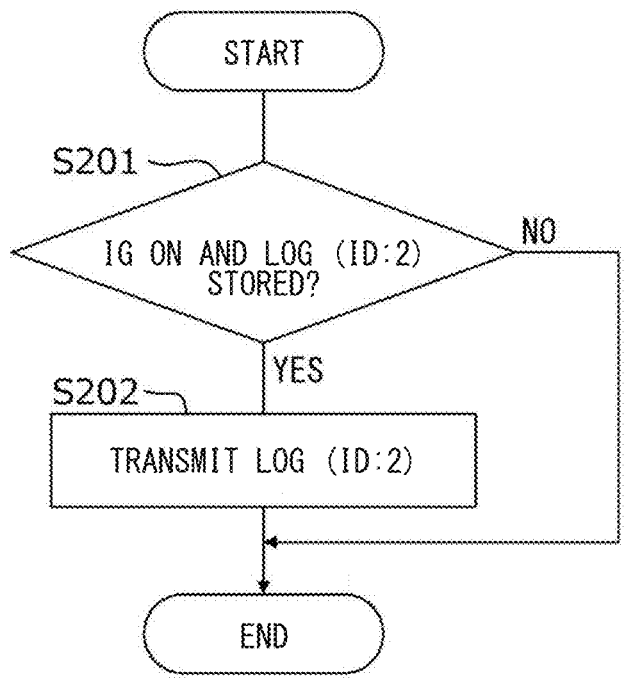
FIG. 8 is a flowchart illustrating operations of the electronic control unit according to a second embodiment.

The operation of the ECU 10 will be described with reference to FIG. 8. The ECU 10 of this embodiment transmits the security event log, which is generated while the IG is not turned on, is stored in the storage 104, and has an event ID of ID:2, to the log management device 20 after the IG is turned on. That is, when the vehicle is activated as a whole, it is checked whether there is a security event log stored in the storage 104. When there is the security event log, the security event log is transmitted to the log management device 20. The time when the vehicle is activated as a whole corresponds to, for example, when the engine of a parked vehicle is started, or when an EV system of an electric vehicle is activated.

In the case where the power source state of the vehicle changes from the IG OFF state to the IG ON state, when the security event log whose event ID is ID:2 is in the storage 104 (S201: Yes), the communication unit 105 transmits the security event log to the log management device 20 (S202). After transmitting the stored security event log, the ECU 10 performs the operations S101 to S107 described in FIG. 7.

In the case where the power source state of the vehicle changes from the IG OFF state to the IG ON state, when there is no security event log with event ID of ID:2 in the storage 104 (S201: No), the communication unit 105 does not transmit the security event log.

According to the ECU 10 of this embodiment, the security event log with an event ID of ID:2 is transmitted to the storage 104 when the power source state of the vehicle is IG ON. Thereby, by transmitting the security event log to the log management device 20, it is possible to use the security event log generated when the power source state of the vehicle is the IG OFF.

Figure 9:
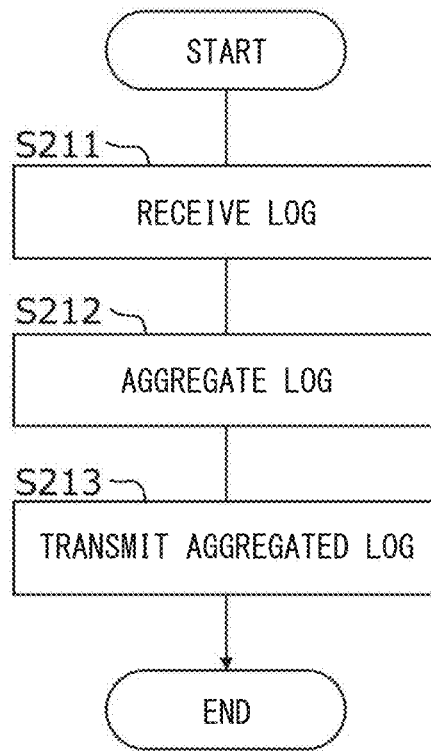
FIG. 9 is a flowchart illustrating operations of a log management device according to the second embodiment.

The operation of the log management device 20 will be described with reference to FIG. 9.

The log management device 20 receives the security event log from the ECU 10 (S211). The received security event logs include those generated when the vehicle power source state is IG ON and IG OFF.

The log aggregation unit 201 aggregates the received security event logs (S212). The log aggregation unit 201 may aggregate the security event logs by referring to the power source information included in the received security event logs. For example, a security event log whose event ID indicates IG ON and a security log whose event ID indicates IG OFF are distinguished and aggregated.

The transfer unit 202 transmits the aggregated security event log to the external device 30 (S213). Here, the transmitted security event log includes the power source information.

Figure 10:
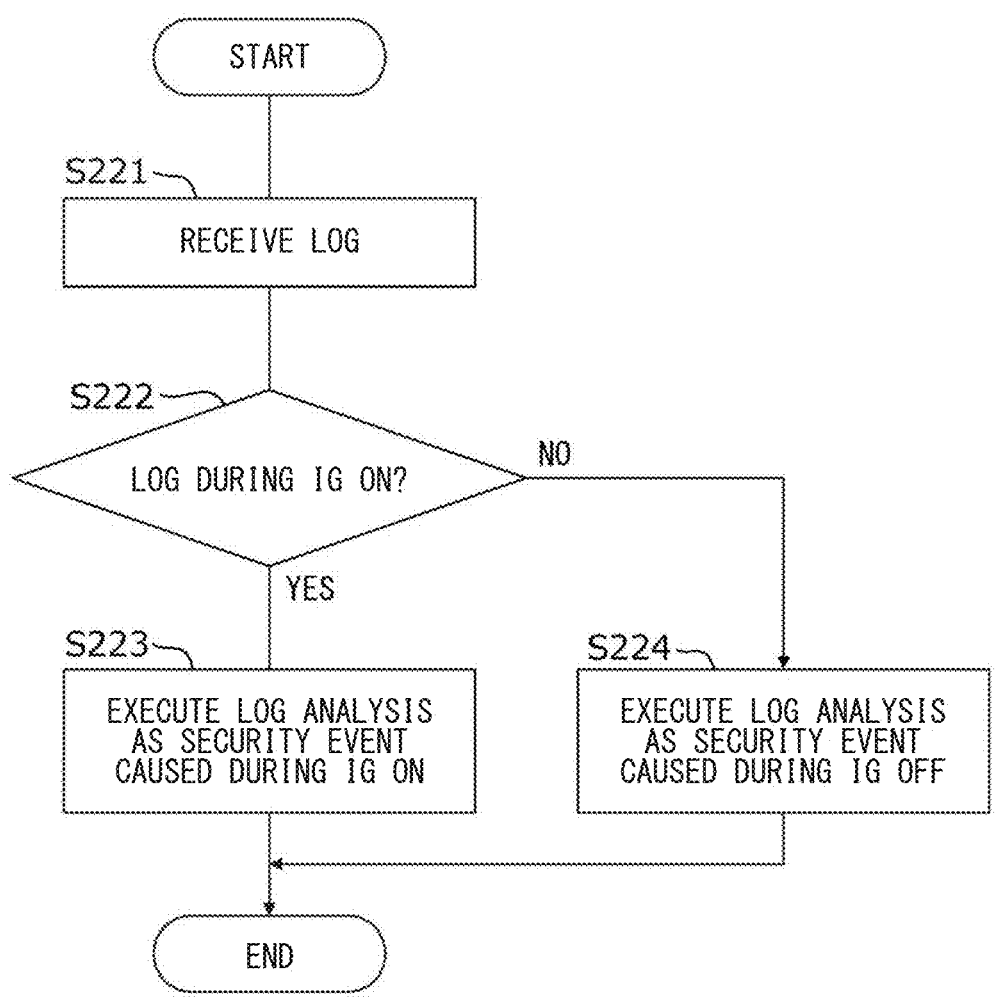
FIG. 10 is a flowchart illustrating operations of an external device 30 according to the first and second embodiments.

The operation of external device 30 will be described with reference to FIG. 10. The external device 30 receives the security event log from the log management device 20 (S221). In the second embodiment, the security event log at the time of the IG OFF is transmitted to the log management device 20 when the change from the IG OFF to IG ON occurs. Therefore, the external device 30 receives, from the log management device 20, the security event logs both when the IG is ON and when the IG is OFF.

The external device 30 checks the vehicle power source state ID included in the received security event log (S222). When the security event log is the security event log obtained during IG ON (S222: Yes), the external device 30 analyzes the security event log as a security event that occurred during the IG ON (S223). When the security event log is not the security event log obtained during IG ON (S222: No), the external device 30 analyzes the security event log as a security event that occurred during the IG OFF (S224).

Note that the first embodiment described above does not specify how the security event log stored in the storage 104 is to be processed. When the security event log stored in the storage 104 is read out in response to a request from a diagnostic device or the like during vehicle diagnosis at. for example, a factory, car dealership, or the like, the external device 30 receives the security event log at the IG OFF state from an external diagnostic device or the like (S221).

Since the external device 30 can identify the power source state of the vehicle at the time of abnormality occurrence using the ID of the security event log, it is possible to perform log analysis of the security event in consideration of the power source state of the vehicle. In general, the types and attack routes of cyberattacks differ between when the power source state is IG OFF, such as when the vehicle is parked, and when the power state IG is ON, such as when the vehicle is moving. Therefore, the accuracy and speed of log analysis can be improved by narrowing down cyberattack candidates based on the power source state of the vehicle at the security event log generation time.

(3) Third Example

In this embodiment, the operations of the ECU 10 and the log management device 20 at the time of activation of the ECU 10 will be described.

Figure 11:
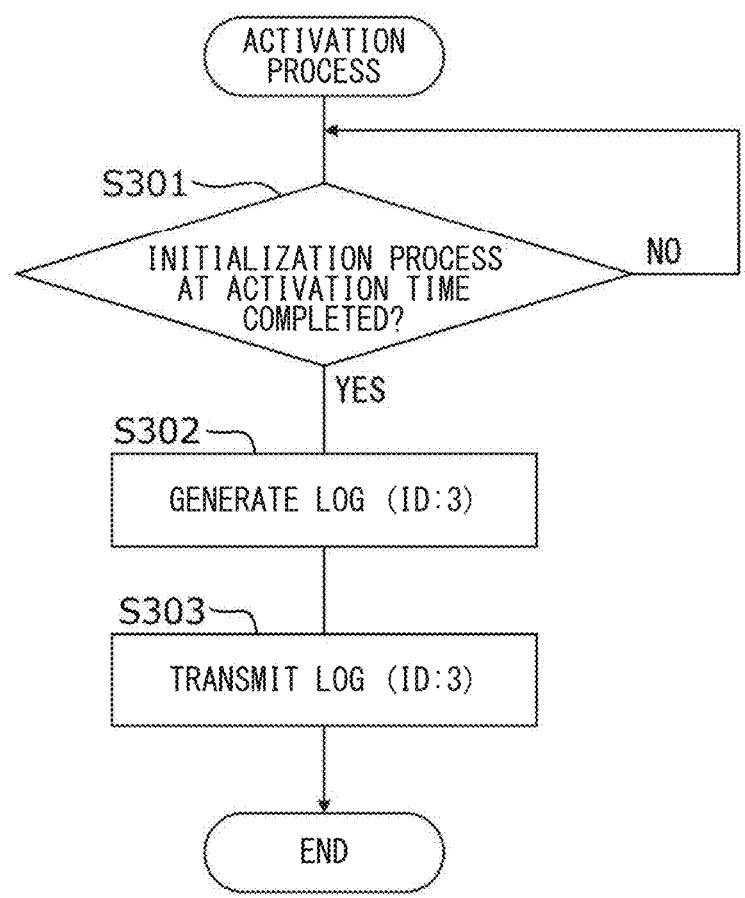
FIG. 11 is a flowchart illustrating operations of the electronic control unit according to a third embodiment.

The operation of the ECU 10 will be described with reference to FIG. 11. The log generation unit 103 of the ECU 10 determines whether an initialization process at the time of activating the ECU 10 is completed (S301). When the initialization process at the activation time has not been completed (S301: No), the process returns to the determination of completion of the initialization process (S301). When the initialization process at the activation time is completed (S301: Yes), an activation notification security event log is generated using a dedicated ID for the activation notification (corresponding to "first activation notification") (S302). Although FIG. 11 shows an example in which ID:3 is assigned to the event ID as the dedicated ID for the activation notification, activation completion may be written in the context data area instead of ID:3. The completion of the initialization process may mean, for example, a state in which the setting information from the previous activation time has been read and set, or a state in which the OS (Operating System) and all necessary applications have been started.

Next, the communication unit 105 transmits the activation notification security event log to the log management device 20 (S303). The security event log is generated when a security-related event occurs. However, the security event log may be generated for notification indicating that the device is normally operating in addition to the abnormality occurrence. In this case, it has the role of a security heartbeat to provide notification indicating that the ECU 10 and security sensor 101 are operating normally. By including information indicating that activation has been completed in the security event log that is generated as a security heartbeat, the security event log can be used as a notification of activation completion. After S303, the ECU 10 performs the operation described in the first example shown in FIG. 7 or the second example shown in FIG. 8.

Figure 12:
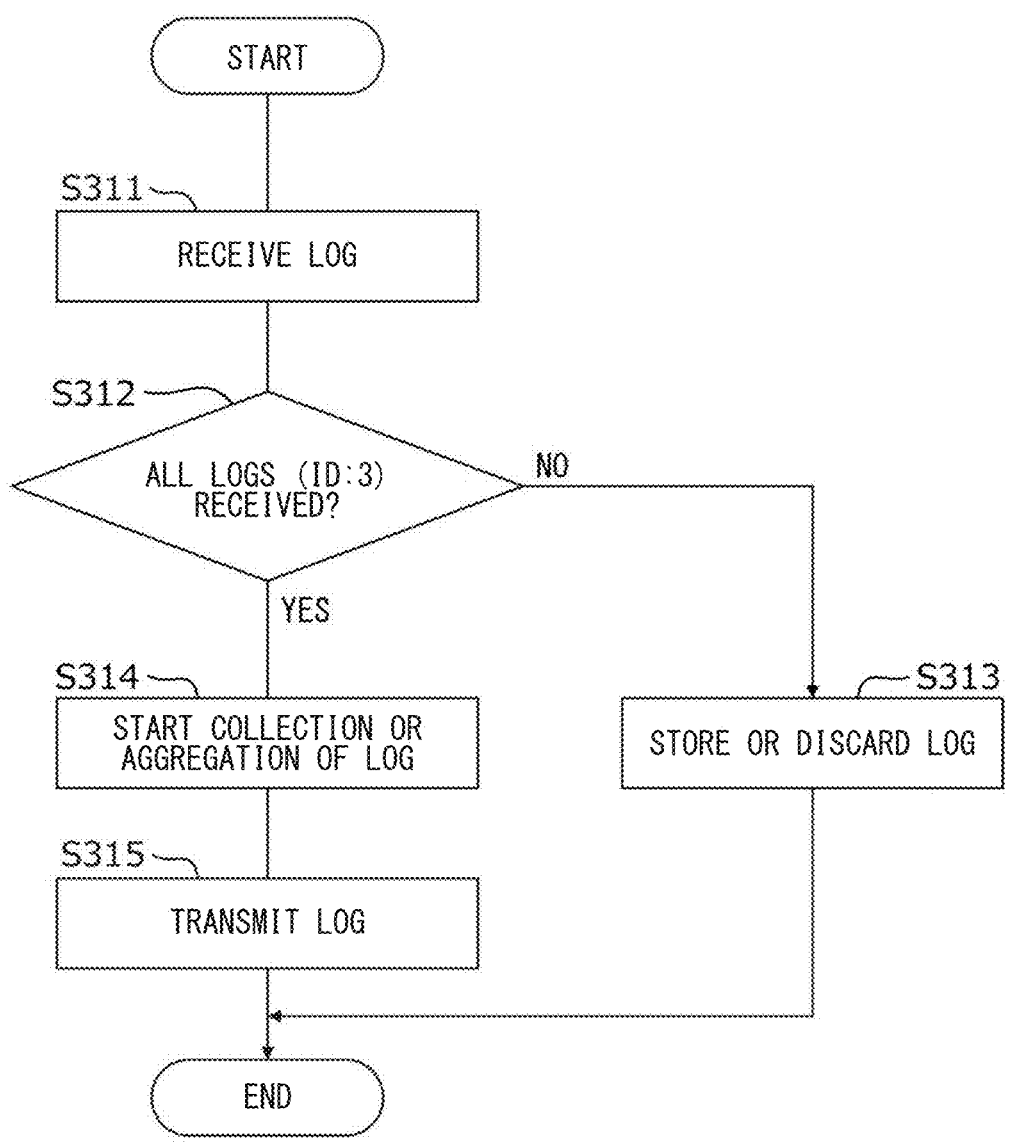
FIG. 12 is a flowchart illustrating operations of the log management device according to the third embodiment.

The operation of the log management device 20 will be described with reference to FIG. 12. The log management device 20 receives the security event log from the ECU 10 (S311).

The activation notification security event log includes a dedicated ID for activation notification (corresponding to "first activation notification"). The log management device 20 determines whether the initialization process of the ECU 10 is completed based on the dedicated ID for the activation notification. That is, it is determined whether the activation notification security event log including the dedicated ID for the activation notification has been received from a predetermined ECU "connected" to the log management device 20 (S312). In this example, it is assumed that the predetermined ECUs are all connected ECUs.

When the log management device 20 has not received the activation notification security event log from all the "connected" ECUs 10 (S312: No), the log management device 20 discards the security event log received in S311 (S313). In this embodiment, the security event log is discarded because the reliability of the security event log is insufficient at a stage when all the ECUs 10 are not activated. The security event log may be discarded each time they are received, or multiple logs may be discarded all at once. However, even when all the ECUs 10 are not activated, a certain degree of reliability of the security event logs sent by the activated ECUs 10 may be recognized and the security event logs may be saved.

When the log aggregation unit 201 of the log management device 20 receives the activation notification security event log from all the "connected" ECUs 10 (S312: Yes), the activation of all the ECUs 10 installed in the vehicle has been determined to be completed, and the collection or aggregation of security event logs starts (S314). Here, the "connected" state may mean not only direct connection to the log management device, but also indirect connection via another electronic control unit or other devices.

In the case of a system that does not use previously received security event logs unless all ECUs are activated, the log management device 20 uses the reception of all security event logs for the activation notification (S312: Yes) as a trigger, and starts collecting and aggregating security event logs (S314). Since the log management device 20 can determine activation of the ECU 10 using communication for the security event log, it is possible to start collecting and aggregating security event logs at an appropriate timing. In this case, the log management device 20 does not need to save the security event log in S313, so the received security event log may be discarded.

In the case of a system that uses previously received security event logs in the state where all ECUs are not activated, the log management device 20 uses the reception of all security event logs for the activation notification (S312: Yes) as a trigger, and starts aggregating security event logs. Since the log management device 20 can determine activation of the ECU 10 using communication for the security event log, it is possible to start aggregating security event logs at an appropriate timing. In this case, the log management device 20 may also save the security event log saved in S313 without discarding it, and may use it as a target for aggregation.

Next, the transfer unit 202 of the log management device 20 transmits the security event log aggregated by the log aggregation unit 201 to the external device 30 (S315).

As described above, by confirming the completion of activation of all ECUs 10, the log management device 20 can start collecting or aggregating the security event log at an appropriate timing even when the times of the ECUs 10 are not synchronized. This example is particularly useful when the log management app of the log management device 20 is started up before the ECU 10 in the activation order.

Other examples of the predetermined ECU include an ECU that ends the operation when IG OFF, and an ECU included in a specific group when a set of logs generated by a specific group of ECUs is required for log analysis. ECU, and the like. Examples of the ECU group include a group of individual ECUs focused on functions as described above.

(4) Forth Example

In this example, unlike the third example, operations of the ECU 10 and the log management device 20 will be described. The operations are performed when not the ECU 10 but the log management device 20 notifies the ECU 10 of activation.

Figure 13:
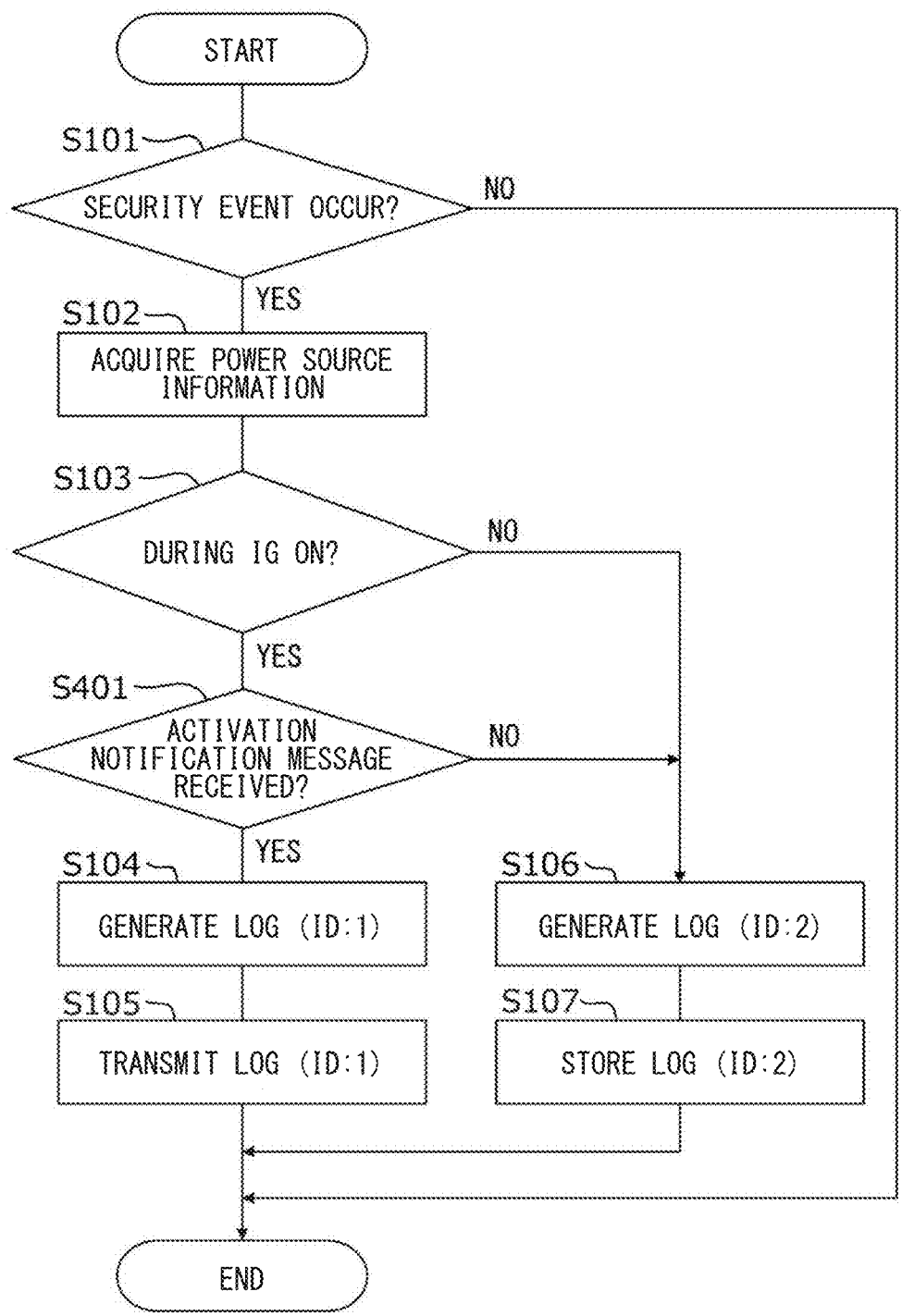
FIG. 13 is a flowchart illustrating operations of the electronic control unit according to a fourth embodiment.

The operation of the ECU 10 will be described with reference to FIG. 13. Since FIG. 13 is the same as FIG. 7 except for S401, the description of FIG. 7 will be cited for the same processes as FIG. 7.

In the case where the power source state of the vehicle is IG ON when the security event occurs in S102 (S103: Yes), the communication unit 105 of the ECU 10 determines whether an activation notification message (corresponding to a "second activation notification") has been received from the log management device 20 (S401). When the activation notification message has not been received (S401: No), the process shifts to S106. When the activation notification message is received (S401: Yes), the process shifts to S104. That is, when the power source state is IG ON and when the activation notification message is received from the log management device 20, the communication unit 105 transmits the security event log (S105). When the power source state is IG OFF or when the activation notification message is not received from the log management device 20, the communication unit 105 does not transmit the security event log, and the storage 104 stores the security event log (S107).

Note that the format of the activation notification message may be a security event log format or another format, such as a CAN data format, for example.

Further, in this example, S401 is executed after S103, but it may be executed before S101. In this case, transmission or storage of the generated security event log is started after receiving the activation notification message.

Figure 14:
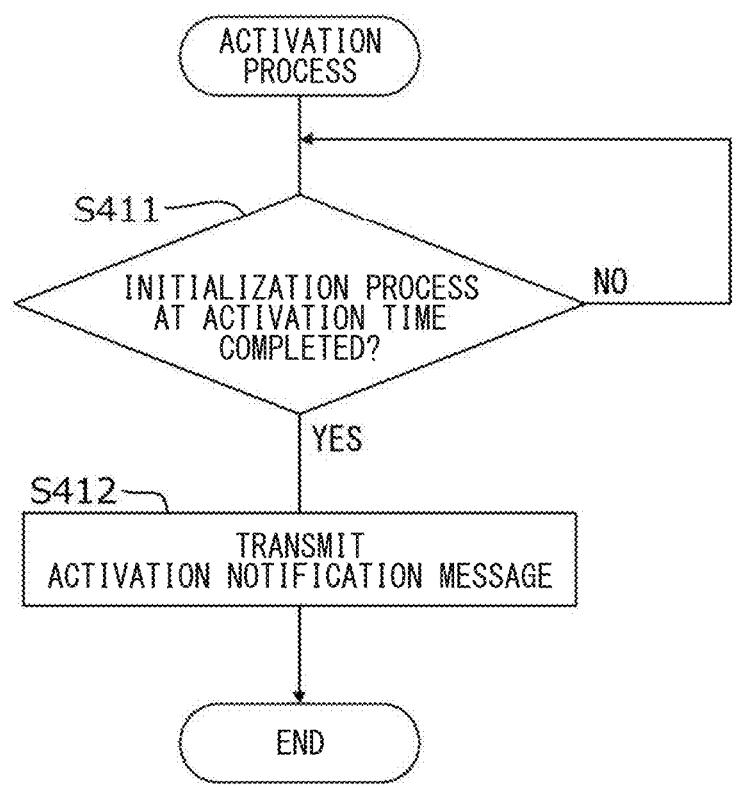
FIG. 14 is a flowchart illustrating operations of a log management device according to the fourth embodiment.

The operation of the log management device 20 will be described with reference to FIG. 14. The log management device 20 determines whether initialization process at the activation time has been completed (S411). When the initialization process at the activation time has not been completed (S411: No), the process returns to S411. When the initialization process at the activation time is completed (Yes in S411), the log management device 20 transmits, to the "connected predetermined ECU", the activation notification message indicating that the log management device 20 has been activated (corresponding to a "second activation notification") (S412). In this example, it is assumed that the predetermined ECUs are all connected ECUs. The operation of the log management device 20 after the activation process is completed is the same as in the second example shown in FIG. 9.

In a case where some ECUs 10 are activated before the log management device 20, even when the ECU 10 issues the activation notification as in the third example, the log management device 20 cannot receive the activation notification from the ECU 10 that is activated first. Therefore, as in this example, the log management device 20 notifies the ECU 10 of activation, so that the ECU 10 can confirm the activation of the log management device 20. This example is particularly useful when, in the activation order, the ECU 10 is activated before the log management app of the log management device 20.

Note that another example of the predetermined ECU is an ECU that operates even when the IG is turned off.

(5) Fifth Example

In this embodiment, the operations of the ECU 10 and the log management device 20 at the end time of the ECU 10 will be described.

Figure 15:
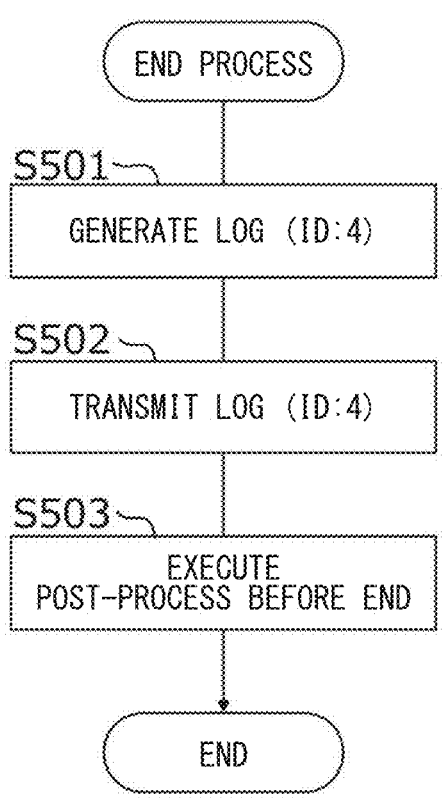
FIG. 15 is a flowchart illustrating operations of the electronic control unit according to a fifth embodiment.

The operation of the ECU 10 will be described with reference to FIG. 15. When the ECU 10 ends its operation, the log generation unit 103 generates a security event log for end notification, including a dedicated ID for end notification indicating that the ECU 10 ends its operation (S501). Although FIG. 15 shows an example in which ID:4 is assigned to the event ID as the dedicated ID for the end notification, the end may be written in the context data area instead of ID:4.

Next, the communication unit 105 transmits the security event log for the end notification to the log management device 20 (S502), executes the post-process before the end (S503), and the ECU 10 ends the operation. The post-process before the end refers to predetermined process to be executed at the end time, such as, for example, a process of saving data of volatile storage means in non-volatile storage means, a process of changing the power source from the ignition power source to the battery power source, a process of ending the application and the OS or the like. The end timing of the ECU 10 is, for example, when the IG is changed from IG ON to IG OFF. After the end, according to this embodiment, the ECU 10 no longer transmits the security event log to the log management device 20, but stores it in the storage 104.

Figure 16:
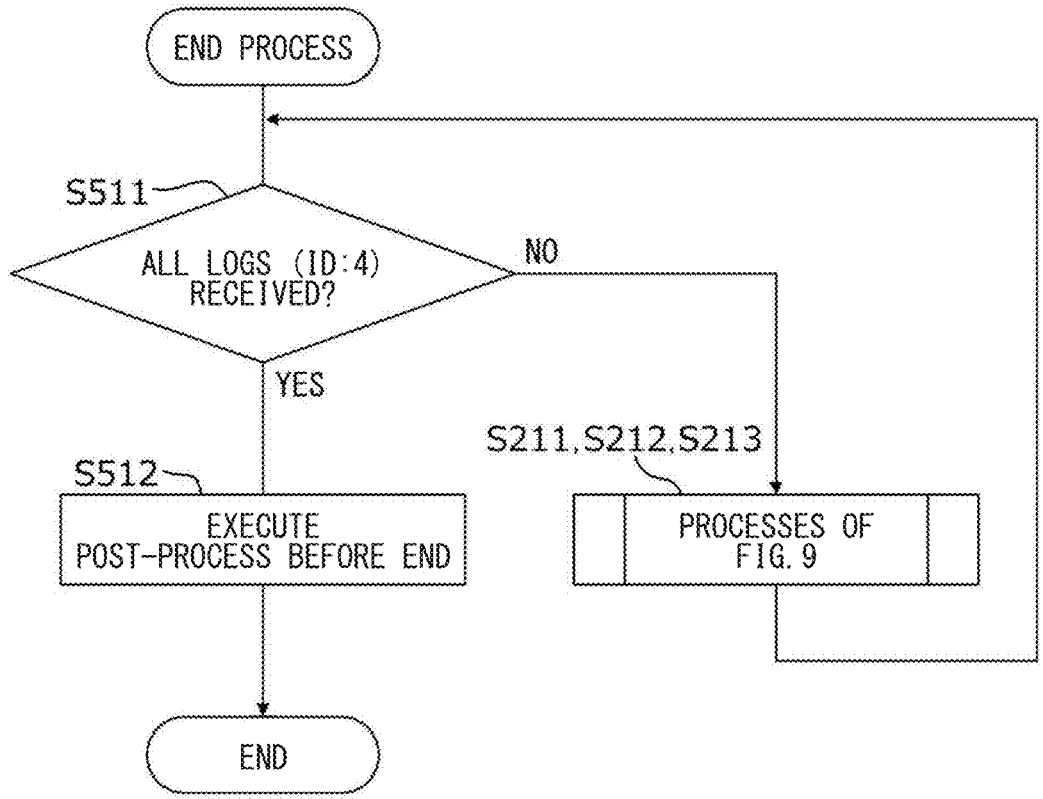
FIG. 16 is a flowchart illustrating operations of a log management device according to a sixth embodiment.

The operation of the log management device 20 will be described with reference to FIG. 16. The log management device 20 determines whether the end notification security event log including the dedicated ID for the end notification has been received from the "connected" predetermined ECU (S511). In this example, it is assumed that the predetermined ECUs are all connected ECUs. When the log management device 20 has not received the end notification security event log from all the connected ECUs 10 (S511: No), the log management device 20 performs the same operation as in the second example shown in FIG. 9. When the log management device 20 receives the end notification security event log from all the connected ECUs 10 (S511: Yes), it ends the operation of the log aggregation unit 201 and the transfer unit 202, and also executes the post-process before the end. The log management device 20 ends its operation (S512). The post-process before the end is similar to the post-process of the ECU 10 described above.

When the vehicle is parked and the IG is turned off, the power source of the entire vehicle is not suddenly turned off due to the IG OFF, but the system is designed to complete the end process over a certain period. In this example, the ECU 10 uses the end notification security event log to notify the log management device 20 that the operation will end, and the log management device 20 confirms the end notifications from all ECUs 10 and then ends the process of the security event log in the log management device 20. In this way, in the end process, by ending the log management device 20 after the end of the ECU 10, it is possible to prevent the log management device 20 from failing to capture the security event log that occurred just before the end of the ECU 10. This example is particularly useful when, in the end order, the ECU 10 ends before the log management app of the log management device 20.

Note that another example of the predetermined ECU is an ECU other than an ECU that does not perform the end operation.

4. General Overview

The features of the electronic control unit, electronic control system, etc. In each embodiment of the present disclosure have been described above.

The terms used in the above embodiments are examples, the terms may be replaced with synonymous terms or terms including synonymous functions.

In the block diagrams used to describe the embodiments, the configurations of the devices are classified and organized for each function. The blocks representing the respective functions may be implemented by any combination of hardware or software. Further, since the blocks show the function, the block diagram can be understood as a disclosure of the method and a disclosure of the program to implement the method.

Functional blocks that can be understood as processes, flows, and methods described in the respective embodiments may be changed in order as long as there is no restriction such as a relationship in which results of preceding other processes are used in subsequent process.

The terms "first", "second", or "N" (N is an integer) used in each embodiment and the present disclosure are used to distinguish two or more configurations and methods of the same type, it does not limit the order or superiority.

Further, examples of the form of the electronic control unit or electronic control system of the present disclosure include the following. Examples of the form of parts include semiconductor elements, electronic circuits, modules, and microcomputers. Examples of semi-finished products include electronic control units (ECUs) and system boards. Examples of finished products may include a smartphone, a tablet computer, a personal computer (PC), a work station, and a server. Other devices include devices with communication functions, such as, for example, video cameras, still cameras, and car navigation systems.

Further, necessary functions such as an antenna and a communication interface may be added to the log management device and the electronic control system.

The present disclosure may be implemented by not only dedicated hardware having the configurations and functions described in each embodiment but also as a combination of a program recorded in a storage medium such as a memory or a hard disk and provided to implement the present disclosure, and general-purpose hardware having a dedicated or general-purpose CPU, which can execute the program, and having a memory and the like. A program may be stored in a non-transitory tangible storage medium including an external storage (for example, hard disk, USB memory, CD/BD), or an internal storage (for example, RAM, ROM) in a special-purpose or general-purpose hardware (for example, computer). Such a program may be downloaded to the storage medium in the hardware via a communication link from a server. Thereby, the latest functions can be provided at all times through program upgrade.

INDUSTRIAL APPLICABILITY

The electronic control unit and electronic control system of the present disclosure may be used for generating security event logs and collecting and aggregating security event logs in an electronic control system installed in objects other than vehicles.

The electronic control system, the electronic control unit, and the method described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the electronic control system, the electronic control unit, and the method described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

The invention claimed is:

1. An electronic control system comprising;
   at least one electronic control unit mounted on a vehicle; and
   a log management device,
   wherein
   the electronic control unit includes:
      a security sensor configured to detect an abnormality in the electronic control unit when a power source state is an ignition-on state and an ignition-off state;
      a power source information acquisition unit configured to acquire power source information indicating the power source state of the vehicle when the abnormality is detected;
      a log generation unit configured to generate a security event log including the power source information based on an output of the security sensor;
      a storage configured to store the security event log; and
      a communication unit configured to transmit the security event log, and
   the log management device includes:
      a log aggregation unit configured to evaluate and/or select the security event log received from the electronic control unit when the power source state is the ignition-on state; and
      a transfer unit configured to transfer the security event log evaluated and/or selected by the log aggregation unit to an external device.

2. The electronic control system according to claim 1, wherein
   the log aggregation unit is configured to refer to the power source information in the security event log to evaluate and/or select the security event log.

3. The electronic control system according to claim 1, wherein
   when the log management device receives, from the electronic control unit, first activation notification indicating that the electronic control unit has been activated, the log aggregation unit starts evaluating and/or selecting the security event log after receiving the first activation notification from a predetermined electronic control unit connected to the log management device.

4. The electronic control system according to claim 1, wherein
   the log management device transmits, to a connected predetermined electronic control unit, second activation notification indicating that the log management device has been activated.

5. The electronic control system according to claim 1, wherein
   when the log management device receives, from the electronic control unit, end notification indicating that an operation of the electronic control unit has ended, the log aggregation unit ends evaluating and/or selecting the security event log after receiving the end notification from a predetermined electronic control unit connected to the log management device.

6. A log processing method executed by an electronic control system comprising; at least one electronic control unit mounted on a vehicle; and a log management device, the method comprising:
   causing the electronic control unit to:
      detect an abnormality in the electronic control unit when a power source state is an ignition-on state and an ignition-off state;
      acquire power source information indicating the power source state of the vehicle when the abnormality is detected;
      generate a security event log including the power source information based on an output of a security sensor;
      store the security event log; and
      transmit the security event log; and
   causing the log management device to:
      evaluate and/or select the security event log received from the electronic control unit when the power source state is the ignition-on state; and
      transfer the security event log that is evaluated and/or selected to an external device.

7. An electronic control unit mounted on a vehicle, the electronic control unit comprising:
   a security sensor configured to detect an abnormality in the electronic control unit;
   a power source information acquisition unit configured to acquire power source information indicating a power source state of the vehicle when the abnormality is detected;
   a log generation unit configured to generate a security event log including the power source information based on an output of the security sensor;
   a storage configured to store the security event log; and
   a communication unit configured to transmit the security event log.

8. The electronic control unit according to claim 7, wherein
   the log generation unit is configured to cause an event identification area of the security event log to include the power source information.

9. The electronic control unit according to claim 7, wherein
   the log generation unit is configured to cause a context area of the security event log to include the power source information.

10. The electronic control unit according to claim 7, wherein the power source state indicates an ignition-on state with use of an ignition power source and/or an ignition-off state without the ignition power source.

11. The electronic control unit according to claim 10, wherein when the power source state is the ignition-on state, the communication unit transmits the security event log, and when the power source state is the ignition-off state, the communication unit does not transmit the security event log and the storage stores the security event log.

12. The electronic control unit according to claim 11, wherein when the power source state changes from the ignition-off state to the ignition-on state, the communication unit transmits the security event log stored in the storage.

13. The electronic control unit according to claim 7, wherein when the electronic control unit is activated, the log generation unit generates the security event log including first activation notification indicating that the electronic control unit has been activated.

14. The electronic control unit according to claim 10, wherein the communication unit is configured to receive, from a log management device, second activation notification indicating that the log management device has been activated, when the power source state is the ignition-on state and the communication unit has received the second activation notification, the communication unit transmits the security event log, and when the power source state is the ignition-off state or when the communication unit has not received the second activation notification, the communication unit does not transmit the security event log and the storage stores the security event log.

15. The electronic control unit according to claim 7, wherein when an operation of the electronic control unit ends, the log generation unit generates the security event log including end notification indicating that the operation of the electronic control unit has ended.

16. A log processing method executed by an electronic control unit mounted on a vehicle, the method comprising:

detecting an abnormality of the electronic control unit;

acquiring power source information indicating a power source state of the vehicle when detecting the abnormality;

generating a security event log including the power source information based on a detection result of the abnormality;

storing the security event log; and transmitting the security event log.

17. A non-transitory computer readable storage medium storing a log processing program executable by an electronic control unit mounted on a vehicle, the program configured to cause a processor to:

detect an abnormality of the electronic control unit;

acquire power source information indicating a power source state of the vehicle when detecting the abnormality;

generate a security event log including the power source information based on a detection result of the abnormality;

store the security event log; and transmit the security event log.

18. The electronic control system according to claim 1, further comprising a processor;

a memory coupled to the processor and storing program instructions that when executed by the processor cause the processor to serve as the log management device.

* * * * *